United States Patent Office 3,161,609
Patented Dec. 15, 1964

3,161,609
COMPOSITION COMPRISING LIQUID PHOSPHATE ESTER, THERMOPLASTIC RESIN AND CELLULOSE DERIVATIVE
Paul R. Graham, Richmond Heights, and Joseph R. Darby, Webster Groves, Mo., assignors to Monsanto Company, a corporation of Delaware
No Drawing. Filed Aug. 22, 1960, Ser. No. 50,833
15 Claims. (Cl. 260—17)

This invention relates to new and useful coating compositions which are particularly suitable for coating the strands or fibers of air filters.

In accordance with this invention it has been found that a composition comprising a major proportion of a liquid phosphate ester, and a minor proportion of a mixture comprising a thermoplastic resin, and minor proportion of certain cellulosic materials is especially useful as a dust collecting medium when applied to the strands or fibers of an air filter. It has been further found that when the composition of this invention is applied to the strands or fibers of an air filter a stable continuous tacky surface results which substantially increases the useful life of the filter.

It will be appreciated by those skilled in the art that the choice and amount of the various components of the compositions of the invention will be subject to adjustment and correlation, and thusly, will depend upon the use for which the composition is intended and the result desired.

In general the coating compositions of this invention contain from about 50 to about 99 parts by weight of liquid phosphate ester, from about 0.5 to about 35 parts by weight of thermoplastic resin and from about 0.5 to about 15 parts by weight of certain cellulosic materials and preferably from about 80 to about 98 parts by weight of liquid phosphate ester to which is mixed 1.5 to 10 parts by weight of a thermoplastic resin and 0.5 to 10 parts by weight of certain cellulosic materials. More preferably the coating compositions of this invention contain from about 92 to about 97 parts by weight of liquid phosphate ester, from about 1 to about 7.5 parts by weight of thermoplastic resin and from about 0.5 to about 2.0 parts by weight of certain cellulosic materials.

The liquid phosphate esters which are useful in the practice of this invention are the liquid neutral phosphate esters which are used as plasticizers for vinyl chloride homopolymers and copolymers and are well known to those skilled in the art; e.g., the liquid alkyl diaryl phosphates, the liquid triaryl phosphates and the liquid dialkyl aryl phosphates. The aryl groups in the esters can contain from 6 to 20 carbon atoms and the alkyl groups from 1 to 20 carbon atoms. In the triaryl phosphates and the alkyl diaryl phosphates, the aryl groups can be the same or different aryl groups, preferably they are the same aryl groups and contain from 6 to 12 carbon atoms. In the dialkyl monoaryl phosphates, the alkyl groups can be the same or different alkyl groups, preferably the two groups contain a total of at least seven carbon atoms. As illustrative of the phosphate esters suitable for use in this invention are methyl diphenyl phosphate, cetyl phenyl cresyl phosphate, 2-ethylhexyl diphenyl phosphate, octyl dicresyl phosphate, dodecyl dicresyl phosphate, 2-ethylhexyl di(tert.-butylphenyl) phosphate, cresyl diphenyl phosphate, phenyl dicresyl phosphate, tricresyl phosphate, 2-ethylhexyl butyl phenyl phosphate, decyl isoamyl cresyl phosphate, methyl cetyl phenyl phosphate, dibutyl phenyl phosphate, dibutyl naphthyl phosphate, octyl butyl phenyl phosphate. Especially preferred liquid phosphate esters for use in this invention are tricresyl phosphate and cresyl diphenyl phosphate.

The thermoplastic resins which can be employed in the compositions of this invention may be selected from a wide variety of polymers, such as polyvinyl acetate, vinyl halide polymers, alkyl acrylate polymers and alkyl methacrylate polymers.

A particularly preferred resin of the above group for use in this invention is polyvinyl acetate having an intrinsic viscosity from about 0.1 to about 0.8 (determined in cyclohexanone at 20° C.).

The term "methacrylate polymer" as used herein is meant to include homopolymers and copolymers of alkyl methacrylates wherein the alkyl group contains from one to eighteen carbon atoms and copolymers thereof with up to 25% by weight of another material copolymerizable therewith, for example, acrylic acid, methacrylic acid, alkyl acrylates wherein the alkyl group contains one to four carbon atoms, vinyl acetate, acrylonitrile, and styrene.

The term "acrylate polymer" as used herein is meant to include homopolymers and copolymers of alkyl acrylates in which the alkyl group contains from one to eight carbon atoms and copolymers thereof with, for example, up to 25% by weight of another material copolymerizable therewith, for example, acrylic acid, methacrylic acid, alkyl methacrylate esters wherein the alkyl groups contain 2 to 4 carbon atoms, vinyl acetate, acrylonitrile and styrene.

A preferred polymer of the above-mentioned group which has been found to give satisfactory results is polymethyl methacrylate.

The "vinyl halide polymers" of this invention are those homopolymers of vinyl compounds such as vinyl chloride, vinyl bromide, vinyl fluoride, and vinyl iodide and copolymers of such vinyl compounds with other ethylenically unsaturated materials copolymerizable therewith, for example, as vinylidene chloride; vinyl esters of carboxylic acids, such as, vinyl acetate, vinyl propionate, vinyl butyrate, vinyl benzoate; esters of unsaturated acids, such as methyl acrylate, ethyl acrylate, propyl acrylate, butyl acrylate, and the corresponding esters of methacrylic acid; vinyl aromatic compounds, such as styrene, orthochlorostyrene, para-chlorostyrene, 2,5-dichlorostyrene, 2,4-dichlorostyrene, para-ethyl styrene, di-vinyl benzene, vinyl naphthalene, α-methyl styrene; dienes such as butadiene, chlorobutadiene, unsaturated amides, such as acrylic acid amide, acrylic acid anilide; unsaturated nitriles, such as acrylic acid nitrile; esters of $\alpha,\beta$-unsaturated carboxylic acids, such as, the methyl, ethyl propyl, butyl amyl, hexyl, heptyl, octyl, allyl, methallyl, and phenyl esters of maleic, crotonic, itaconic, fumaric acids and the like. The class of copolymers in which a predominant proportion, i.e. more than 50% by weight of the monomer units are vinyl halide units, any balance being monomer units derived from an ethylenically unsaturated comonomer, represents a preferred class of resins to be in the compositions of this invention. Polyvinyl chloride and copolymers containing more than 80% of vinyl chloride monomer units are especially preferred, particularly a solution grade polyvinyl chloride, such as the "Geon 400 x 110."

Such solution grade resins and their preparation are well known to the art. They are usually prepared in a solution-type polymerization process which results in a low molecular weight polymer.

Preferably solution grade resins are employed in this invention, but are not essential since resins made by dispersion, bulk and suspension-type polymerization processes can be used but are found to be difficult to handle. Those skilled in the art will be in a position to choose the particular resin to meet specific conditions and circumstances under which the compositions are to be employed, e.g. as coating compositions, plastisol dispersants and sealing compositions.

As illustrative of the cellulosic materials contemplated by this invention are the cellulose esters and ethers.

The "cellulose esters" which can be used in the composition of this invention, are the cellulose derivatives of the lower alkane monocarboxylic acids such as cellulose acetate, cellulose butyrate, cellulose propionate; mixed esters e.g., cellulose acetate-butyrate and cellulose acetate-propionate.

The "cellulose ethers" are the lower alkyl cellulose ethers and carboxyalkyl cellulose ethers in which the alkyl group contains from 1 to 4 carbon atoms, e.g., methyl cellulose, ethyl cellulose, carboxymethyl cellulose, carboxyethyl cellulose, carboxypropyl cellulose, and carboxybutyl cellulose.

The mixed esters of cellulose are prepared by activating cellulose with glacial acetic acid, then reacting the product with a mixture of acids and anhydrides. Cellulose acetate-butyrate is a preferred cellulosic material in the compositions of this invention.

The compositions of this invention can be prepared by simply mixing the liquid phosphate ester, thermoplastic resin, and cellulosic material and heating until a solution results. However, gelation of the composition is difficult to control under these conditions.

A preferred method of preparing these compositions, as set forth in Table I, below comprises mixing a liquid phosphate ester with the indicated substances in the amounts set forth. The liquid phosphate ester is heated to 120° C. The thermoplastic resin is added slowly with agitation until solution takes place, during which time the temperature is maintained at 120±5° C. The cellulosic material is then added with vigorous stirring. The batch is allowed to cool to room temperature. The viscosity is measured after two hours.

*Table I*

| Composition | A | B | C | D | E |
|---|---|---|---|---|---|
| Tricresyl phosphate | 95 | 95 | 95 | | |
| Cresyl diphenyl phosphate | | | | 90 | |
| 2-ethylhexyl diphenyl phosphate | | | | | 88 |
| Polyvinyl acetate [1] | 4 | | | 4 | 4 |
| Polymethyl methacrylate [2] | | 4 | | | |
| Polyvinyl chloride | | | 4 | | |
| Cellulose acetate-butyrate | 1 | 1 | 1 | 6 | 8 |

[1] Intrinsic viscosity 0.11 (polymer commercially available under the trade name "AYAC").
[2] Viscosity at 30° C., 40% solids in toluol, 480–640 centipoises.

The viscosities of the compositions set forth above at 23° C. are obtained on a Brookfield Model HAT viscometer using as No. 5 spindle. The viscosity in centipoises of the various compositions is set forth in Table II below.

*Table II*

| R.p.m. | Composition | | | | |
|---|---|---|---|---|---|
| | A | B | C | D | E |
| 2.5 | 16,300 | 13,440 | 16,600 | 8,000 | 11,700 |
| 5 | 10,400 | 8,960 | 12,960 | 7,200 | 11,200 |
| 10 | 6,800 | 6,400 | 8,800 | 6,600 | 9,000 |
| 20 | 4,500 | 4,320 | 6,240 | 6,000 | 8,000 |
| 50 | 2,700 | 3,070 | 4,560 | 5,600 | 6,000 |
| 100 | 1,800 | 2,240 | 3,320 | 5,000 | 4,600 |
| Yield Value, dyne/cm.[2] | 295 | 204 | 182 | 40 | 25 |

Similar results to the foregoing are obtained upon replacing the cellulose acetate-butyrate with the corresponding mixed ester of cellulose, cellulose acetate-propionate.

Compositions A, B, C, D and E in Table I produce a highly tacky surface and have excellent thixotropic flow properties.

Compositions prepared with (1) the liquid phosphate ester and thermoplastic resin without the cellulosic material, and (2) the liquid phosphate ester and cellulosic material without the thermoplastic resin are shown in Table III.

*Table III*

| Composition | A | B | C | D |
|---|---|---|---|---|
| Tricresyl phosphate | 94 | 90 | 90 | 98.5 |
| Polyvinyl acetate [1] | | | 10 | |
| Polymethyl methacrylate [2] | | 10 | | |
| Polyvinyl chloride | 6 | | | |
| Cellulose acetate-butyrate | | | | 1.5 |

[1] Intrinsic viscosity 0.11 (polymer commercially available under trade name "AYAC").
[2] Viscosity at 30° C., 40% solids in toluol, 480–640 centipoises.

The viscosities of the compositions set forth above at 23° C. are obtained on a Brookfield Model HAT viscometer using a No. 5 spindle. The viscosities in centipoises of the various compositions are set forth in Table IV below.

*Table IV*

| R.p.m. | Composition | | | |
|---|---|---|---|---|
| | A | B | C | D |
| 2.5 | 4,000 | 1,920 | 4,000 | 48,640 |
| 5 | 2,800 | 1,600 | 4,000 | 29,760 |
| 10 | 2,400 | 1,600 | 3,880 | 17,120 |
| 20 | 2,100 | 1,570 | 3,840 | 11,000 |
| 50 | 1,960 | 1,450 | 3,880 | 6,000 |
| 100 | 1,920 | 1,480 | 3,820 | 3,840 |
| Yield Value, dyne/cm.[2] | 60 | 16 | 0 | 944 |

Compositions A, B, and C in Table IV are characterized by good tack stability with poor thixotropic flow properties. Composition D has pronounced thixotropic flow properties and a tack free surface.

Results similar to those obtained with compositions A, B, C and D of Table I are obtained when the following copolymers are used in place of the polyvinyl acetate of these compositions:

Copolymers produced from a mixture of:

(1) 75% methyl methacrylate and 25% butyl acrylate
(2) 85% methyl methacrylate and 15% methyl acrylate
(3) 75% methyl methacrylate and 25% vinyl acetate
(4) 85% methyl methacrylate and 15% acrylonitrile
(5) 80% methyl acrylate and 20% vinyl acetate
(6) 85% methyl acrylate and 15% methyl methacrylate
(7) 85% vinyl chloride and 15% vinyl acetate
(8) 80% vinyl chloride and 20% vinylidene chloride
(9) 90% vinyl chloride and 10% methyl acrylate
(10) 80% vinyl chloride and 20% ethyl methacrylate.

From the foregoing results it is evident that the compositions of this invention as illustrated by compositions set forth in Tables I and II have the necessary low viscosity values at high shear, high viscosity values at low shear, and yield values to permit high speed spraying and at the same time remain resistant to flow after being applied to the filter.

While this invention has been described with respect to certain embodiments it is not so limited and it is to be understood that variations and modifications thereof may be made which are obvious to those skilled in the art without departing from the spirit or scope of this invention.

The embodiments of the invention in which an exclusive property or privilege is claimed are defined as follows:

1. A liquid composition consisting essentially of from about 80 to about 98 percent by weight of a liquid phosphate ester, from about 1.5 to about 10 percent by weight of a thermoplastic resin selected from the group consisting of polyvinyl acetate, a vinyl halide polymer containing more than 50% of the polymerized vinyl halide monomer, a methacrylate polymer containing at least 75% of the polymerized methacrylate monomer and an acrylate polymer containing at least 75% of the polymerized acrylate monomer, the balance of said polymers comprising a different monoethylenically unsaturated monomer in polymerized form, and from about 0.5 to about 10 percent by weight of a cellulosic material selected from the group consisting of cellulose esters of lower alkane monocarboxylic acids, mixed cellulose esters of lower alkane monocarboxylic acids; lower alkyl cellulose ethers and carboxyalkyl cellulose ethers.

2. A composition of claim 1 wherein the cellulosic material is a mixed ester of cellulose.

3. A composition of claim 2 wherein the cellulosic material is cellulose acetate-butyrate.

4. A composition of claim 2 wherein the cellulosic material is cellulose acetate-propionate.

5. A composition of claim 1 wherein the liquid phosphate ester is tricresyl phosphate.

6. A composition of claim 1 wherein the liquid phosphate ester is cresyl diphenyl phosphate.

7. A composition of claim 1 wherein the liquid phosphate ester is 2-ethylhexyl diphenyl phosphate.

8. A composition of claim 1 wherein the thermoplastic resin is polyvinyl acetate having an intrinsic viscosity from about 0.1 to about 0.8.

9. A composition of claim 1 wherein the thermoplastic resin is a vinyl halide polymer in which at least 80% of the monomer units are vinyl halide units.

10. A composition of claim 1 wherein the thermoplastic resin is polymethyl methacrylate.

11. A liquid composition consisting essentially of from about 92 to about 97 percent by weight of tricresyl phosphate, from about 7.5 to about 1.0 percent by weight of polyvinyl acetate having an intrinsic viscosity of about 0.1 to about 0.3 and from about 0.5 to about 2.0 percent by weight of cellulose acetate-butyrate.

12. A liquid composition consisting essentially of from about 92 to about 97 percent by weight of tricresyl phosphate, from about 7.5 to about 1.0 percent by weight of polymethyl methacrylate, and from about 0.5 to about 2.0 percent by weight of cellulose acetate-butyrate.

13. A liquid composition consisting essentially of from about 92 to about 97 percent by weight of tricresyl phosphate, from about 7.5 to about 1.0 percent by weight of polyvinyl chloride, and from about 0.5 to about 2.0 percent by weight of cellulose acetate-butyrate.

14. A liquid composition consisting essentially of from about 92 to about 97 percent by weight of tricresyl phosphate, from about 7.5 to about 1.0 percent by weight of polyvinyl acetate having an intrinsic viscosity of about 0.1 to about 0.3 and from about 0.5 to about 2.0 percent by weight of cellulose acetate-propionate.

15. A liquid composition consisting essentially of from about 92 to about 97 percent by weight of tricresyl phosphate, from about 7.5 to about 1.0 percent by weight of polymethyl methacrylate, and from about 0.5 to about 2.0 percent by weight of cellulose acetate-propionate.

References Cited in the file of this patent

UNITED STATES PATENTS

| 1,873,689 | Walsh et al. | Mar. 23, 1928 |
| 2,889,297 | Brandner et al. | June 2, 1959 |
| 3,025,181 | Nuessle et al. | Mar. 13, 1962 |

FOREIGN PATENTS

| 308,657 | Great Britain | July 25, 1930 |
| 308,658 | Great Britain | Sept. 25, 1930 |
| 335,582 | Great Britain | Sept. 25, 1930 |